US009153198B2

(12) United States Patent
Hunkins

(10) Patent No.: US 9,153,198 B2
(45) Date of Patent: Oct. 6, 2015

(54) METHOD AND DEVICE FOR LINK OVER-TRAINING

(71) Applicant: ATI Technologies ULC, Markham (CA)

(72) Inventor: James D. Hunkins, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 287 days.

(21) Appl. No.: 13/626,195

(22) Filed: Sep. 25, 2012

(65) Prior Publication Data

US 2014/0085273 A1 Mar. 27, 2014

(51) Int. Cl.

| | |
|---|---|
| ***G06F 3/06*** | (2006.01) |
| ***G09G 5/00*** | (2006.01) |
| *G06F 5/00* | (2006.01) |

(52) U.S. Cl.

CPC ............ *G09G 5/006* (2013.01); *G09G 2330/12* (2013.01); *G09G 2370/10* (2013.01)

(58) Field of Classification Search

None

See application file for complete search history.

(56) References Cited

U.S. PATENT DOCUMENTS

| | | | | |
|---|---|---|---|---|
| 6,031,866 | A | 2/2000 | Oler et al. | |
| 6,885,209 | B2 | 4/2005 | Mak et al. | |
| 7,814,371 | B2 | 10/2010 | Sams et al. | |
| 7,844,762 | B2 | 11/2010 | Banks | |
| 8,341,325 | B2 | 12/2012 | Goodart et al. | |
| 2007/0192505 | A1 | 8/2007 | Dalmia | |
| 2009/0028073 | A1 * | 1/2009 | Barrett et al. | 370/276 |
| 2012/0079162 | A1 * | 3/2012 | Jaramillo | 710/316 |

FOREIGN PATENT DOCUMENTS

WO WO2010/123237 A2 10/2010

OTHER PUBLICATIONS

VESA Introduces DisplayPort v1.2, Business Wire, http://www.businesswire.com/portal/site/home/permalink/?ndmViewID= . . . posted Jan. 8, 2010 and accessed Mar. 25, 2013.

International Search Report and Written Opinion mailed Oct. 29, 2013 in related International Application No. PCT/CA2013/050728.

* cited by examiner

*Primary Examiner* — Scott Sun

(74) *Attorney, Agent, or Firm* — Faegre Baker Daniels LLP

(57) ABSTRACT

A method and device of over training a connection is provided. Noise is intentionally supplied and added to a signal that is subjected to a link training operation. The link training operation is used to obtain a link between a source device and a receiving device. The device includes a noise source from which noise is obtained and added to a signal to aid in link over-training.

11 Claims, 3 Drawing Sheets

METHOD AND DEVICE FOR LINK OVER-TRAINING

FIELD OF THE DISCLOSURE

The present disclosure is related to methods and devices for improving signal link quality between devices which utilize link training. The present disclosure is related more specifically to methods and devices for injecting noise into a training signal to achieve a better link between devices which utilize link training.

BACKGROUND

The DisplayPort architecture, promulgated by the Video Electronics Standards Association (VESA), utilizes a link layer that implements a link service. It is one of many types of communications protocols that implement link services. The link service in DisplayPort and within a source device is used to discover, configure and maintain a link with a device which it connects to. The link service configures the link through what is known as link training. Link training is a process where different control settings are adjusted at a source and destination until the quality of the signal in training is optimized and matched between the source and receiver. These settings affect the electrical properties (the strength and shape) of a transmitted signal and how the signal is read at the receiver. The training process is controlled through handshaking between the DisplayPort transmitter (graphics output) and receiver (repeater, hub, or display) over an auxiliary channel. Link Training is an iterative process. Combinations of number of signal lanes and signal speeds may be tried as part of the training sequence. A satisfactory result delivers a transmitter and receiver tuned to each other for accurate signal transmission. It is possible that the training results deliver a tuned result that is not optimized but instead is set near the edge of acceptable levels. In such cases, the receiver may occasionally miss signals due to noise on the lines or other factors that negatively impact the signal quality. As a result, the receiver is more likely to lose synchronization with the source which can result in screen flicker and loss of signal which results in a loss of the display image.

The specification for DisplayPort indicates that once a signal is successfully received during the training sequence, an additional adjustment should be done either at the source or destination to add additional fidelity. It has been found that, in practice, such a final adjustment is not always performed. Accordingly, the signal quality may be potentially on the edge of the optimal settings for best margin which results in potential signal loss periodically.

Furthermore, the operation of the final training adjustment(s) is controlled by the firmware within the receiver (display). Such firmware is often set at the factory and is not readily updatable post production.

Accordingly, there exists a need for a device and method for improving signal link quality between devices which utilize link training such as, for example, in DisplayPort signals.

DETAILED DESCRIPTION OF EMBODIMENTS

In an exemplary and non-limited embodiment, some aspects of the invention are embodied in a method whereby noise is intentionally supplied and added to a signal that is subjected to a link training operation. The link training operation is used to obtain a link between a source device and a receiving device.

Briefly, in one exemplary embodiment, a method of training a data link is provided including selectively and intentionally adding noise to a signal; and using the signal with the noise added thereto to train a data link.

In another example, a device having a trainable data link is provided including: a data stream source; a noise source; and a link controller that implements a link training operation. The device is operable to selectively apply noise from the noise source to a signal from the data stream source such that a combined noise and data signal is employed during times when the link controller is actively implementing the link training operation.

In yet another example, a computer readable medium containing non-transitory instructions thereon is provided. When interpreted by at least one processor, the instructions cause the at least one processor to: supply a signal having noise deliberately added thereto for processing by a link training operation.

Figure 1:
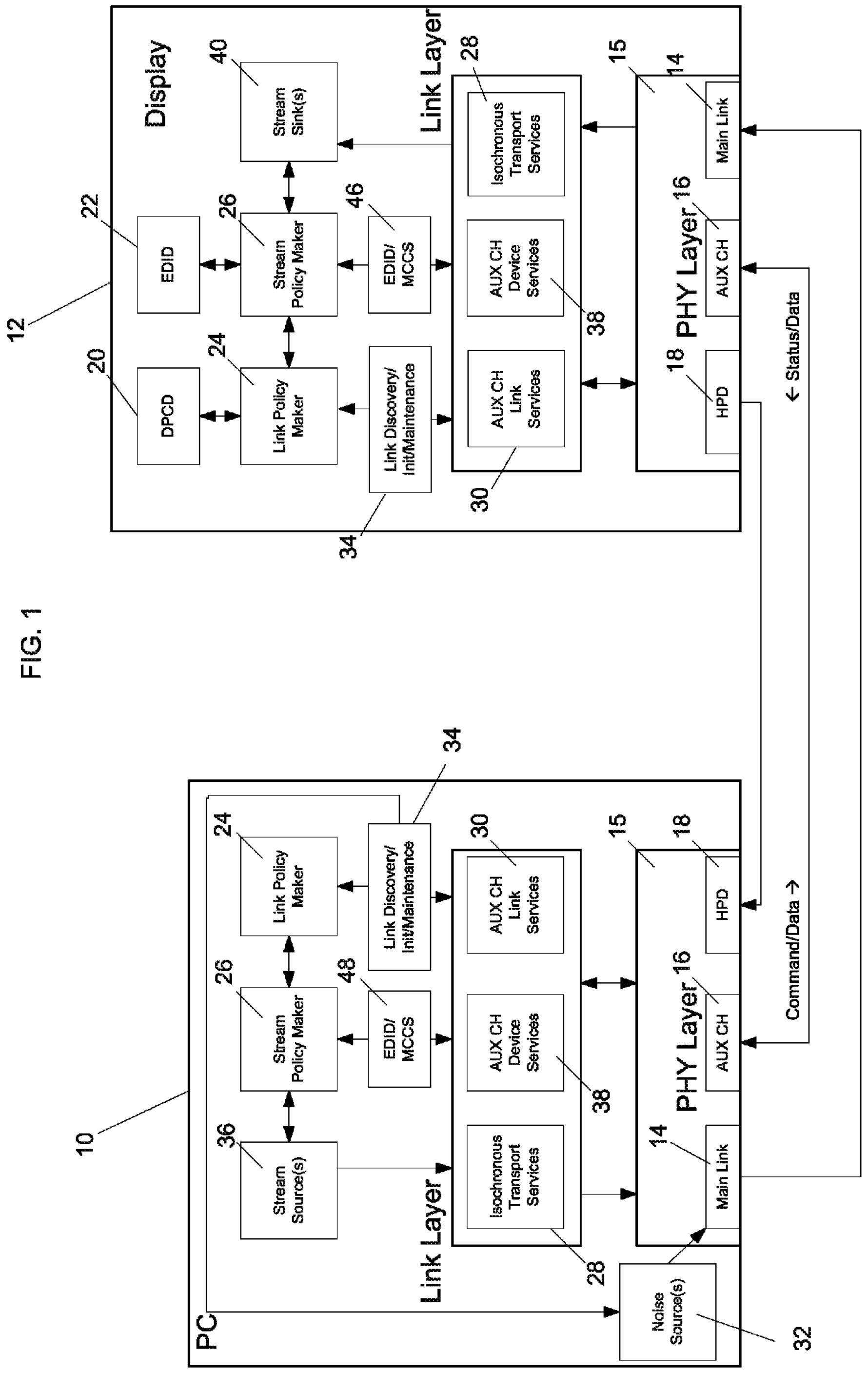
FIG. 1 is a diagram showing architecture of a system employing DisplayPort technology.

FIG. 1 shows architecture for providing video information from a graphics device (GPU/APU of PC 10) to a display (panel 12), repeater, hub, or the like having DisplayPort architecture. DisplayPort provides an AC-coupled voltage-differential interface. The interface consists of three different channels: main link 14, AUX channel 16, and hot plug detect (HPD) 18. Main link 14 features one, two, or four scalable data pairs (or lanes) that can be operated at different rates (Gbit/sec). These features are implemented by settings within a PHY layer 15. Main link 14 is responsible for transmission of a stream from stream source 36. The main link rate is determined by a number of factors, including the capabilities of the transmitter and receiver (i.e. graphics source device and display), the quality of the cable and noise in the system. The stream is ultimately supplied to stream sink 40 of display 12.

DisplayPort configuration data (DPCD) 20 in display 12 describes the receiver's capabilities and stores the display's connection status. Extended Display Identification Data (EDID) 22, tells the source device (PC 10) of the capabilities of display 12 once it is connected. Link policy maker 24 and stream policy maker 26 manage the link and the stream 36 respectively.

The link layer is responsible for the isochronous transport 28, link 30, and device 38 services. In the output device (i.e. the graphics card, GPU), the isochronous transport service 28 maps the video and audio streams into a format with a set of rules that main link 14 will understand so that the data can scale across the number of lanes available in main link 14. Additionally, when the data reaches display 12, the rules allow the streams to be reconstructed into their original format.

Link service 30 is used to discover, configure, and maintain the link with devices it connects to. Link service 30 does this using DPCD 20 via auxiliary channel 16. When hot-plugging is detected via hot-plug channel 18, PC 10 (or other source device) reads the capabilities of display 12 via DPCD 20 and embodied at least partially in EDID 22. This data is transferred to the link layer (illustrated at 46), transferred to source device 10, read from the link layer of source device 10 (illustrated at 48) where it is used to configure the link as part of link training.

Link training is a process where various properties of the link are adjusted (number of enabled lanes, link rate, rise and fall time, voltage level, slopes of rise and fall) via a handshake between the DisplayPort transmitter (graphics device of PC 10) and receiver (display 12) over auxiliary channel 16. After Link Training has been completed during normal operation, display 12 uses hot-plug channel 18 to report changes—for example, when a loss of synchronization is detected.

PC 10 further includes noise source 32. Noise source 32 is operable to selectively inject noise into the stream to be transmitted over main link 14. Noise source 32 can be one or a combination of existing parts of PC 10. Still further, embodiments are envisioned where noise source 32 is a custom designed noise source that provides a specific type of noise deemed to be helpful in achieving a high quality tuned connection. Examples of sources 32 includes clock distribution methods (differential vs. CMOS); removing a first noise filter from cascaded phase-locked loops, increasing the level of the spread spectrum setting, and other noise sources related to ASIC routing, signal isolation, tying to power or ground rails. The source of noise can be chosen to be the source providing the nearest match to observed noise on DisplayPort lanes under normal system operation. Each of the above listed noise sources are often available without having to add any physical components to existing systems.

Injection of noise from noise source 32 is at least partially controlled by link discovery/initialization module 34 of PC 10. Link discovery/initialization module 34 of PC 10 is illustratively a driver and the below functionality is implemented through driver programming.

Figure 2:
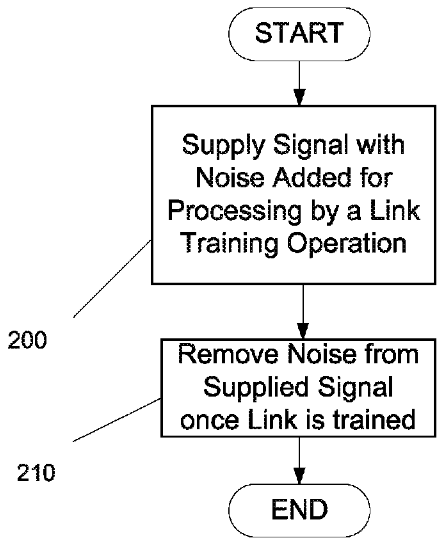
FIG. 2 is a flowchart showing exemplary operation of the system of FIG. 1 according to an embodiment of the disclosure.
Figure 3:
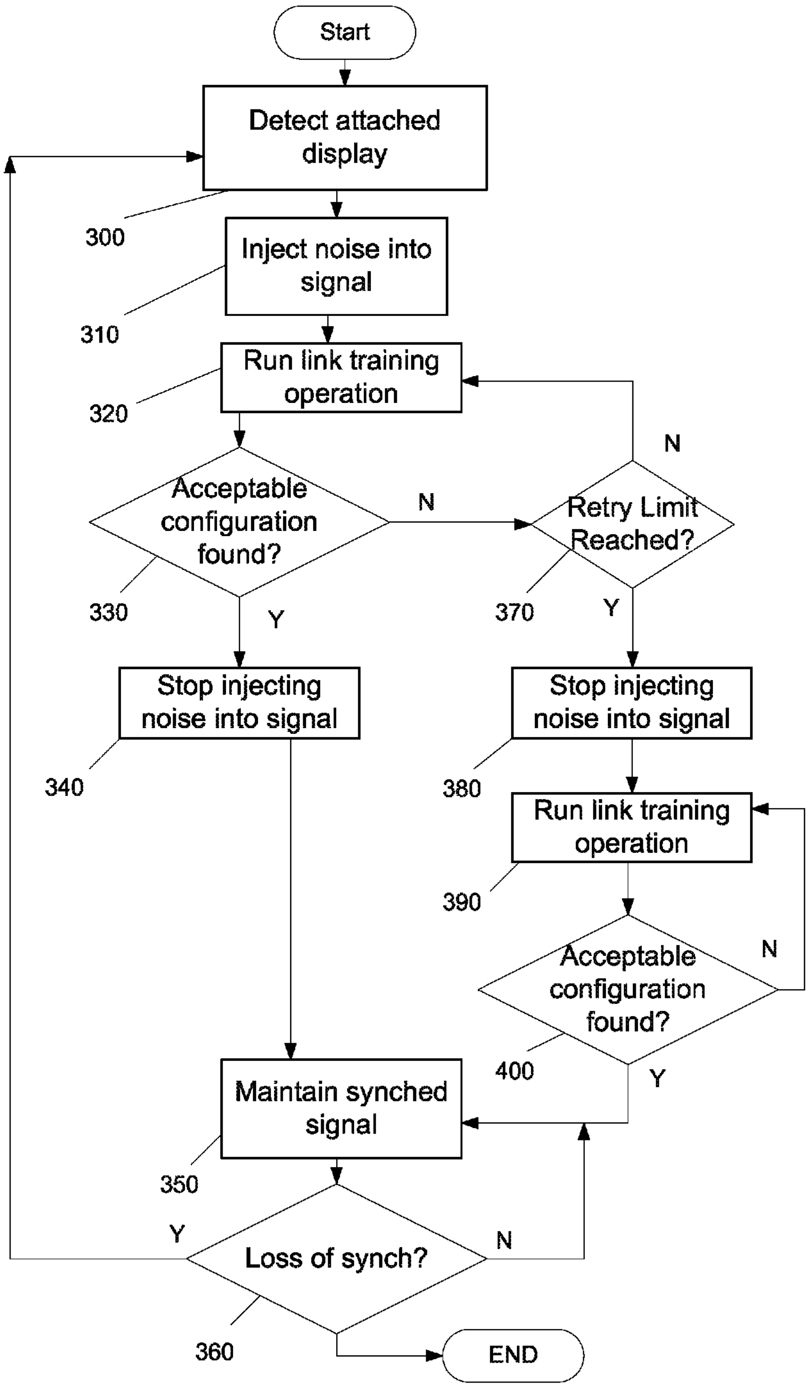
FIG. 3 is a flowchart showing exemplary operation of the system of FIG. 1 according to another embodiment of the disclosure.

In one embodiment, as illustrated in FIG. 2, noise is inserted into the signal supplied to main link 14. The "noisy" signal is transmitted such that it is received by display 12 and processed by the link training operations of display 12, block 200. In addition, if desired, the noise is removed from the supplied signal once the link is successfully trained (or the operation times out), block 210.

More specifically, in operation, whenever link training is active, (such as when a display is detected but not synchronized, block 300) discovery/initialization module 34 instructs noise source 32 to be active and inject noise into the data stream transmitted over main link 14, block 310. This noisy signal is then supplied to display 12 during the training operation, block 320.

In the present embodiment, as a consequence of having noise intentionally added therein, when link policy maker 24 of display 12 analyzes the received signal, link policy maker 24 of display 12 sees a degraded signal relative to that which would be seen if noise source 32 were not active. Thus, during link training, block 320, a subset of link configurations may be found unacceptable that would be found acceptable if the noise were not present. Link training will thus pass over those unacceptable configurations in continued search for an acceptable configuration. These passed over configurations are likely those that would make the link susceptible to interruption upon the system experiencing noise of a level similar to that provided by noise source 32. Accordingly, existing link training operations present in sinks (such as display 12) are supplied with a signal with noise added therein, block 200, to force tuning the link, if possible, to a more robust setting compared to a setting that may have been used if the link training operations used a stream without noise added. By requiring no changes in sink devices, this embodiment of the disclosure (including source device 10 and signals sent thereby) is fully backward compatible with existing DisplayPort capable sink devices (for example those following DisplayPort Protocol Versions 1.0, 1.1, 1.2, 1.3).

If an acceptable link is found, block 330, link discovery/initialization module 34 instructs noise source 32 to stop injecting noise into the data stream transmitted over main link 14, block 340. The system has thus trained itself to find a link configuration that is able to tolerate more noise from a signal that is expected to be regularly encountered. Thus, system "hiccups" or noise from other sources is less likely to disrupt the link. The system then maintains the synchronized configuration, block 350, for so long as the synchronization is not interrupted, block 360.

Occasionally, the addition of noise via noise source 32 may make the link so noisy that it is not possible to establish a link. Accordingly, link discovery/initialization module 34 includes a counter. If a satisfactory link is not found within a reasonable number of trial iterations during which noise source 32 is active, block 370, link discovery/initialization module 34 instructs noise source 32 to be inactive and to stop injecting noise into the data stream transmitted over main link 14 despite not having established a satisfactory link, block 380. In this way, noise source 32 is not permitted to prevent establishment of a link when a link is only possible without the noise provided by noise source 32. Once noise source 32 is removed, link training is re-attempted, block 390, 400.

Alternatively, link discovery/initialization module 34 instructs that a link be established without first activating noise source 32. Once a link is established, noise source 32 is activated by link discovery/initialization module 34 to see if a more robust link can be achieved. Upon achieving the more robust link or upon a certain retry limit reached without achieving the more robust link, noise source 32 is again deactivated by link discovery/initialization module 34.

In yet another alternative, link discovery/initialization module 34 instructs that a link be established without first activating noise source 32. A DisplayPort error counter register is then checked for errors. If the error count is below a threshold, then no further action is taken. If the error count is above a threshold, then noise source 32 is activated by link discovery/initialization module 34 to see if a more robust link can be achieved. Again, if a more robust link cannot be achieved within a desired timeframe, noise source 32 is deactivated by link discovery/initialization module 34. Accordingly, when possible, a more robust link is achieved without having to alter the firmware within an attached panel.

While the above disclosure has been put forth with reference to DisplayPort technology, it should be appreciated that the concepts can be applied to any system where signal training is present (such as PCI).

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the afore-described software, logic, and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of training a data link including:

obtaining signal noise by one of changing clock distribution methods associated with the data link; removing a first noise filter from cascaded phase-locked loops associated with the data link, increasing a level of a spread spectrum setting associated with the data link, and other noise sources related to routing, isolation, and tying to a power or ground rail;

selectively and intentionally adding the obtained noise to a signal; and using the signal with the noise added thereto to train a data link.

2. The method of claim 1, further including removing the noise from the signal once the data link is trained.

3. The method of claim 1, further including obtaining noise from a noise source.

4. The method of claim 3, further including detecting a display attached to the data link.

5. The method of claim 4, wherein the noise source is added to the signal in response to detecting the display.

6. The method of claim 5, wherein the noise source is added to the signal based upon detecting the attached display and detecting a lack of synchronization with the display.

7. A device having a trainable data link including:

a data stream source;

a noise source; and a link controller that implements a link training operation; the device operable to detect that a display is coupled to the data link and in response to said detection, selectively apply noise from the noise source to a signal from the data stream source such that a combined noise and data signal is employed during times when the link controller is actively implementing the link training operation.

8. The device of claim 7, wherein the device is operable to remove the noise from the signal from the data stream source once link training is achieved.

9. A system for communicating over a trainable data link including:

a data stream source;

a noise source, noise from the noise source is obtained by one of changing clock distribution methods associated with the data link; removing a first noise filter from cascaded phase-locked loops associated with the data link, increasing a level of a spread spectrum setting associated with the data link, and other noise sources related to routing, isolation, and tying to a power or ground rail;

a data stream sink; and a link controller that implements a link training operation; the system operable to selectively apply noise from the noise source to a signal from the data stream source such that a combined noise and data signal is received by the data stream sink and employed to train a link between the data stream source and the data stream sink.

10. The system of claim 9, wherein the system is operable to selectively cease applying noise to the signal from the data source upon achieving a satisfactory link between the data source and sink.

11. The system of claim 9, wherein the data stream source and sink communicate according to DisplayPort protocol.

* * * * *